(12) United States Patent
Kang et al.

(10) Patent No.: US 11,952,064 B2
(45) Date of Patent: Apr. 9, 2024

(54) SYSTEM FOR ASSEMBLING BODY PANEL

(71) Applicants: Hyundai Motor Company, Seoul (KR); Kia Motors Corporation, Seoul (KR)

(72) Inventors: Sekyu Kang, Ulsan (KR); In Ho Jeong, Ulsan (KR); Seon Woo Kweon, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 600 days.

(21) Appl. No.: 16/855,506

(22) Filed: Apr. 22, 2020

(65) Prior Publication Data
US 2021/0094637 A1    Apr. 1, 2021

(30) Foreign Application Priority Data
Sep. 26, 2019 (KR) .................. 10-2019-0118694

(51) Int. Cl.
| | | |
|---|---|---|
| *B23K 37/04* | (2006.01) | |
| *B23K 37/047* | (2006.01) | |
| *B62D 65/02* | (2006.01) | |
| *B62D 65/18* | (2006.01) | |
| *B23K 101/00* | (2006.01) | |

(52) U.S. Cl.
CPC ........ *B62D 65/026* (2013.01); *B23K 37/0443* (2013.01); *B23K 37/047* (2013.01); *B62D 65/022* (2013.01); *B62D 65/18* (2013.01); *B23K 2101/006* (2018.08); *B60Y 2410/124* (2013.01)

(58) Field of Classification Search
None
See application file for complete search history.

(56) References Cited

U.S. PATENT DOCUMENTS

| | | | | |
|---|---|---|---|---|
| 4,589,184 A | * | 5/1986 | Asano | B62D 65/06 29/430 |
| 5,184,766 A | * | 2/1993 | Takahashi | B23K 37/047 29/430 |
| 5,267,683 A | * | 12/1993 | Hamada | B23K 37/047 29/430 |
| 6,193,142 B1 | * | 2/2001 | Segawa | B25J 9/009 219/127 |
| 6,467,475 B2 | * | 10/2002 | Leutner | F24C 15/04 160/310 |
| 9,051,015 B2 | * | 6/2015 | Jang | B62D 65/18 |

(Continued)

*Primary Examiner* — Devang R Patel
(74) *Attorney, Agent, or Firm* — Fox Rothschild LLP

(57) ABSTRACT

A vehicle body assembly system is provided. A pre-buck section and a main-buck section are formed along a transport path of a floor assembly of the system. In particular, the system includes a pre-buck unit disposed in the pre-buck section and that regulates a lower portion of a different side assembly for each vehicle model with respect to opposite sides of the floor assembly, regulates a cowl and a front roof rail with respect to an upper portion of the side assembly, and key-welds the upper portion of the side assembly, the cowl, and the front roof rail. A main-buck unit is disposed in the main-buck section and regulates a rear roof rail and a package tray with respect to the upper portion of the side assembly pre-assembled in the pre-buck unit, and key-welds the upper portion of the side assembly, the rear roof rail, and the package tray.

18 Claims, 17 Drawing Sheets

(56) References Cited

U.S. PATENT DOCUMENTS

| | | | | |
|---|---|---|---|---|
| 2018/0043475 A1* | 2/2018 | Lee | ........................ | B23K 31/02 |
| 2018/0065693 A1* | 3/2018 | Lee | ..................... | B23K 37/0435 |
| 2018/0065694 A1* | 3/2018 | Lee | ...................... | B62D 65/026 |
| 2018/0162470 A1* | 6/2018 | Kim | ........................ | B62D 65/02 |

* cited by examiner

SYSTEM FOR ASSEMBLING BODY PANEL

CROSS-REFERENCE TO RELATED APPLICATION

This application claims priority to and the benefit of Korean Patent Application No. 10-2019-0118694 filed on Sep. 26, 2019, the entire contents of which are incorporated herein by reference.

BACKGROUND

(a) Field of the Disclosure

The present disclosure relates to a system for assembling a vehicle body, and more particularly, to a vehicle body assembling system that corresponds to vehicle body assembling of various models of vehicles in a vehicle body assembly line.

(b) Description of the Related Art

In general, a vehicle body is made in the form of a white body (BIW) by undergoing a process of assembling various product panels produced in a vehicle body sub-process. A vehicle body is formed of a floor panel that supports a drivetrain such as an engine, an axle, and the like and a seat from below the frame, opposite side panels forming left and right sides of the frame, a roof panel forming an upper side of the frame, and parts of a plurality of cowl panels, roof rails, package trays, a back panel, and the like. Assembly of the vehicle body parts is performed through a main-buck process (also referred to as a vehicle body built-up process in the art).

In the main-buck process, the back panel is bonded to the floor panel through the vehicle body assembly system, and then the opposite side panels, the cowl panels, the roof rail, and the package tray are assembled by welding. For example, the vehicle body assembly system regulates the side panels through side gates, sets the side panels to the floor panel, sets the cowl panel, the roof rail, and the package tray to the side panels, and then welds bonding portions of the parts using a welding robot.

A vehicle body assembly system according to a conventional art is provided with a rotation index (also typically referred to as "four-side rotor" in the art) that installs a side gate per vehicle model in each of four sides. The four-side rotation index is rotated in a state where the side panel for each vehicle model is regulated through each side gate, and side panels of the corresponding vehicle model may be positioned at opposite sides of the floor panel. Therefore, in the conventional art, the upper end portion of the side panel, correlated parts, the lower end portion of the side panel, and floor panel may be welded by a welding robot while positioning the correlated components (e.g., a cowl panel, a roof rail, and a package tray) in the upper end portion of the side panel regulated by the side gate of the four-side rotation index.

However, in the conventional art, the entire frame of the vehicle body is regulated at one time through the side gate for each vehicle model of the four-side rotation index, which causes increased weight and scale of the entire vehicle body assembly system. Further, since side gates for each vehicle model are installed on each side of the four-sided rotation index, vehicle body assembling of more than 5 vehicle models is not possible and it is necessary to additionally install large and high weighted equipment.

The above information disclosed in this section is merely for enhancement of understanding of the background of the disclosure and therefore it may contain information that does not form the prior art that is already known in this country to a person of ordinary skill in the art.

SUMMARY

Exemplary embodiments of the present disclosure have been made in an effort to provide a vehicle body assembly system capable of assembling a vehicle body of a plurality of vehicle models by separating a vehicle body assembly process into two processes rather than forming a frame of a vehicle body through a single process, and may reduce the weight of the entire equipment.

A vehicle body assembly system according to an exemplary embodiment of the present disclosure, in which a pre-buck section and a main-buck section are respectively formed along a transport path of a floor assembly, may include: i) a pre-buck unit disposed in the pre-buck section and configured to regulate a lower portion of a different side assembly for each vehicle model with respect to opposite sides of the floor assembly, regulate a cowl and a front roof rail with respect to an upper portion of the side assembly, and key-weld the upper portion of the side assembly, the cowl, and the front roof rail; ii) and a main-buck unit disposed in the main-buck section, configured to regulate a rear roof rail and a package tray with respect to the upper portion of the side assembly that is pre-assembled in the pre-buck unit, and key-weld the upper portion of the side assembly, the rear roof rail, and the package tray.

In addition, in the vehicle body assembly system, the pre-buck unit may include: a rotation index provided to be reciprocally movable in a vehicle width direction in pre-buck frames at opposite sides of the transport path, and may be tiltably rotatable at a predetermined angle; and a side hanger detachably provided in a handling robot, coupled with the rotation index, and regulates a lower portion of the side assembly.

The pre-buck unit may further include: a first gripper detachably provided in the handling robot, coupled to a first side of a first post frame fixed to the moving member, and configured to regulate a cowl and an upper portion of the side assembly; and a second gripper detachably provided in the handling robot, coupled with a second side of the first post frame, and configured to regulate a front roof rail and the upper portion of the side assembly. In addition, the first and second grippers may be detachable/attachable to the first post frame through the handling robot.

The main-buck unit may include: a third gripper detachably provided in a handling robot, coupled with a first side of a second post frame fixed to main buck frames at opposite sides of the transport path, and configured to regulate a rear roof rail and the upper portion of the side assembly; and a fourth gripper detachably provided in the handling robot, coupled to a second side of the second post frame, and configured to regulate the package tray and the upper portion of the side assembly. In addition, the third gripper and the fourth gripper may be detachably/attachably provided in the second post frame through the handling robot.

A vehicle body assembly system in which a pre-buck section and a main-buck section are respectively formed along a transport path of a floor assembly, according to an exemplary embodiment of the present disclosure may include: i) a moving member reciprocally movable in a vehicle width direction in pre-buck frames at opposite sides of the transport path in the pre-buck section; ii) a rotation index provided to be tiltably rotatable at a predetermined angle on the moving member; iii) a side hanger detachably provided in a handling robot, coupled with the rotation index through the handling robot, and configured to regulate a lower portion of a side assembly; iv) a first post frame provided in a fixed manner to the moving member; v) a first gripper detachably provided in the handling robot, coupled to a first side of the first post frame, and configured to regulate a cowl and an upper portion of the side assembly; vi) a second gripper detachably provided in the handling robot, coupled to a second side of the first post frame, and configured to regulate a front roof rail and the upper portion of the side assembly; vii) a second post frame provided in a fixed manner in main-buck frames at opposite sides of the transport path in the main-buck section; viii) a third gripper detachably provided in the handling robot, coupled to a first side of the second post frame, and configured to regulate a rear roof rail and the upper portion of the side assembly; and ix) a fourth gripper detachably provided in the handling robot, coupled to a second side of the second post frame, and configured to regulate a package tray and the upper portion of the side assembly.

The rotation index may include: a pair of index frames disposed at a distance from each other on the moving member; a rotor having four sides where the side hanger that is different for each vehicle model may be detachably provided and rotatably provided in the index frame through a driver; a hanger coupling portion disposed in each side of the rotor and pin-coupled with the side hanger; and a plurality of dampers disposed in each side of the rotor and fix the side hanger to the rotor. In addition, the hanger coupling portion may include a docking clamp to which a first coupling pin provided in the side hanger may be coupled while being fitted therein.

The side hanger may include: a hanger frame detachably provided at an arm front end of the handling robot; at least one reference pin disposed in the hanger frame and fitted in a reference aperture of the side assembly; a plurality of dampers disposed in the hanger frame, clamp a lower portion of the side assembly, and regulate a vehicle body transport direction and a height direction of the side assembly; and a first coupling pin disposed in the hanger frame and coupled with a docking clamp provided in the rotation index.

In addition, dampers that correspond to a front pillar, a center pillar, and a rear pillar of the side assembly among the plurality of dampers may be reciprocally installed in a vehicle body transport direction. A plurality of mounting seats may be formed to additionally mount the dampers in the hanger frame.

Further, docking clamps where a second coupling pin and a third coupling pin respectively disposed in the first gripper and the second gripper are coupled while being fitted thereto may be provided in the first post frame. In addition, docking clamps where a fourth coupling pin and a fifth coupling pin respectively provided in the third gripper and the fourth gripper are coupled while being fitted thereto may be provided in the second post frame.

The first gripper may include: a first gripper frame detachably disposed at an arm front end of the handling robot; a plurality of dampers disposed in the first gripper frame and clamp an upper portion of the side assembly and a cowl; and a second coupling pin disposed in the first gripper frame and coupled with a docking clamp provided in a first side of the first post frame.

The second gripper may include: a second gripper frame detachably provided in an arm front end of the handling robot; a plurality of dampers disposed in the second gripper frame and clamp an upper portion of the side assembly and a front roof rail; and a third coupling pin disposed in the second gripper frame and coupled with a docking clamp provided in a second side of the first post frame.

In addition, the system may include a third gripper frame detachably provided in an arm front end of the handling robot; a plurality of dampers disposed in the third gripper frame and clamp an upper portion of the side assembly and a rear roof rail; and a fourth coupling pin disposed in the third gripper frame and coupled with a docking clamp provided in a first side of the second post frame.

The fourth gripper may include: a fourth gripper frame detachably disposed in an arm front end of the handling robot; a plurality of dampers disposed in the fourth gripper frame and clamp an upper portion of the side assembly and a package tray; and a fifth coupling pin disposed in the fourth gripper frame and coupled with a docking clamp provided in a second side of the second post frame.

In addition, a first storage portion may be disposed in the pre-buck section to store the side hangers that are different for vehicle models, the first grippers, and the second grippers, respectively. A second storage portion may be disposed in the main-buck section to the third grippers and the fourth grippers that are different for vehicle models.

The system may further include first welding robots disposed in the pre-buck section, key-weld the lower portion of the side assembly and the floor assembly, and key-weld the upper portion of the side assembly, the cowl, and the front roof rail; and second weld robots disposed in the main-buck section, and key-weld the upper portion of the side assembly, the rear roof rail, and the package tray. The exemplary embodiments of the present disclosure enable flexible production of multiple models, reduce equipment preparation time, reduce weight and simplification of the entire equipment, and reduce investment costs when adding models in the initial stage.

Further, effects that may be obtained or expected from exemplary embodiments of the present disclosure are directly or suggestively described in the following detailed description. In other words, various effects expected from exemplary embodiments of the present disclosure will be described in the following detailed description.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
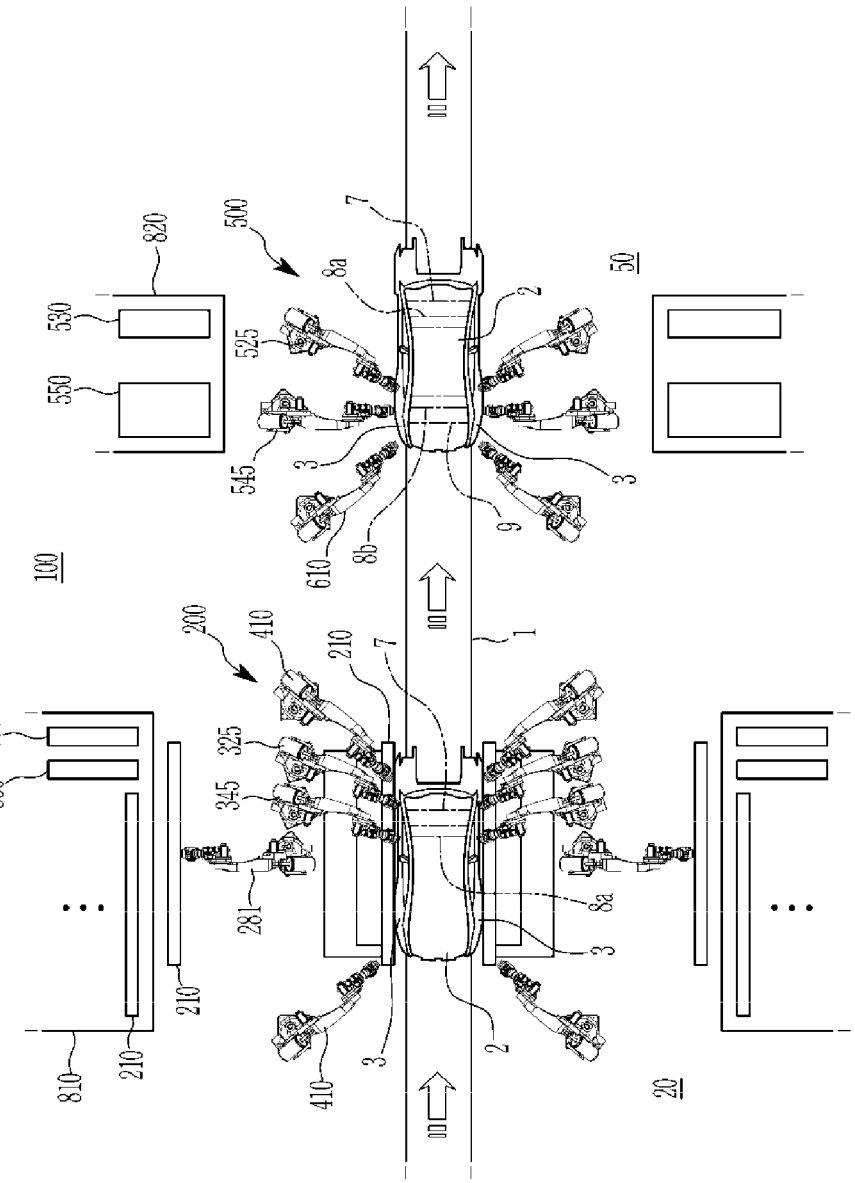
FIG. 1 is a schematic block diagram of a vehicle body assembly system according to an exemplary embodiment of the present disclosure.

Accordingly, the drawings and description are to be regarded as illustrative in nature and not restrictive, and like reference numerals designate like elements throughout the specification. Because the size and thickness of each configuration shown in the drawings are arbitrarily shown for better understanding and ease of description, the present disclosure is not limited thereto, and the thicknesses of portions and regions are exaggerated for clarity. Further, in the following detailed description, names of constituent elements, which are in the same relationship, are divided into "the first", "the second", etc., but the present disclosure is not necessarily limited to the order in the following description FIG. 1 is a schematic block diagram of a vehicle body assembly system according to an exemplary embodiment of the present disclosure. Referring to FIG. 1, a vehicle body assembly system 100 according to an exemplary embodiment of the present disclosure regulates and welds vehicle body assembly parts conveyed in a sub-assembly line of a vehicle body factory using a jig, and may be applied to a vehicle body assembly line that completes the degree of frame of a vehicle body white body (BIW).

The vehicle body assembly line may include a process for assembling a floor assembly, which becomes a foundation of a vehicle body, a process for assembling a side assembly, which is a wall part of the vehicle body, and a process for assembling cowls, roof rails, and package trays to the side assembly. In particular, the process of assembling the side assembly to the floor assembly and assembling the cowl, roof rail, and package tray to the side assembly may also be referred to as a buck process in the art. The buck process is a process that fixes a welding fixture using a jig, and integrally assemblies a side body assembly and an under body while swinging, rotating, and shifting the welding fixture.

Figure 2:
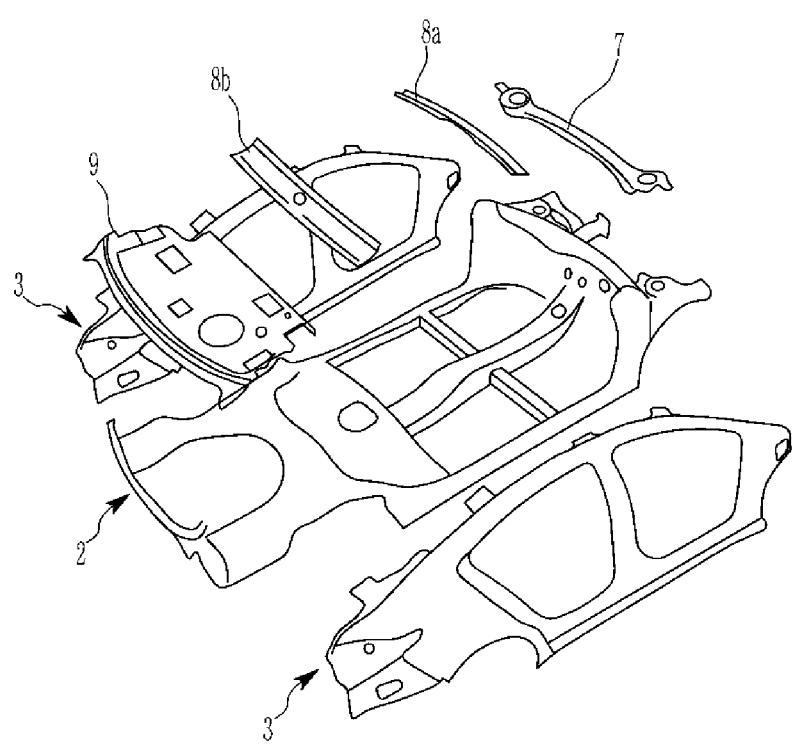
FIG. 2 illustrates an example of vehicle body parts assembled by the vehicle body assembly system according to the exemplary embodiment of the present disclosure.

The vehicle body assembly system 100 according to the exemplary embodiment of the present disclosure may be applied to a buck process in which a floor assembly, left and right side assemblies, a cowl, front and rear roof rails, and a package tray are assembled through spot welding equipment using a robot in a vehicle body assembly line. Further, as shown in FIG. 2, the vehicle body assembly system 100 may assemble side assemblies 3 to opposite sides of the floor assembly 2, assemble a cowl 7 and a front roof rail 8a to a front side of the side assemblies 3, and assemble a rear roof rail 8b and a package tray 9 to a rear side of the side assemblies 3 with reference to the floor assembly 2 that is transported along a predetermined transport path through a vehicle transfer line 1.

In the exemplary embodiment of the present disclosure, the transport direction of the floor assembly 2 is defined as the vehicle body transport direction, and in the art, the vehicle body transport direction is referred to as a T direction, a vehicle width direction is referred to as an L direction, and a vehicle body height direction is referred to as an H direction. However, in the exemplary embodiment of the present disclosure, the LTH directions will be defined respectively as a vehicle body transport direction, a vehicle width direction, and a vehicle height direction.

Further, "end (one side/first side end or the other side/second side end)" in the following description may be defined as an end of any side, or may be defined as a portion (e.g., one side/first side end portion or the other side/second side end portion) that includes the end. The vehicle body assembly system 100 according to the exemplary embodiment of the present disclosure has a structure in which at least more than 5 of vehicle models may be assembled by separating a vehicle body assembly process into two processes rather than forming a vehicle body frame through a single process, and the entire equipment may be reduced in weight.

Accordingly, the vehicle body assembly system 100 according to the exemplary embodiment of the present disclosure may set a pre-buck section 20 and a main-buck section 50 that are partitioned according to the transport path of the vehicle transfer line 1. In addition, the vehicle body assembly system 100 according to the exemplary embodiment of the present disclosure may include a pre-buck unit 200 formed in the pre-buck section 20 and a main-buck unit 500 formed in the main-buck section 50.

The pre-buck unit 200 and the main-buck unit 500 may be provided in one frame in each of the pre-buck section 20 and the main-buck section 50, or may be provided in each frame. This frame supports constituent elements to be described below, and may include various accessory components such as bracket, block, plate, housing, cover, and collar. However, since the accessory components are for installing the respective constituent elements in a frame, excluding exceptional cases, the above-mentioned accessory components are collectively referred to as frames in the exemplary embodiment of the present disclosure.

In the exemplary embodiment of the present disclosure, the pre-buck unit 200 may be configured to regulate a lower portion of the side assembly 3, which is different for each vehicle model, on both sides of the floor assembly 2 in the pre-buck section 20, and pre-assemble the lower portion to the floor assembly 2. In addition, the pre-buck unit 200 may be configured to regulate the cowl 7 and the front roof rail 8a with respect to an upper portion of the side assembly 3, and assemble the cowl 7 and the front roof rail 8a to the upper portion of the side assembly 3. Further, the pre-buck unit 200 may key-weld the lower portion of the side assembly 3 and the floor assembly 2, and key-weld the upper portion of the side assembly 3 and the cowl 7 and the front roof rail 8a. The pre-buck unit 200 may be disposed in opposite sides of the transport path of the vehicle transfer line 1 in the pre-buck section 20.

Figure 3:
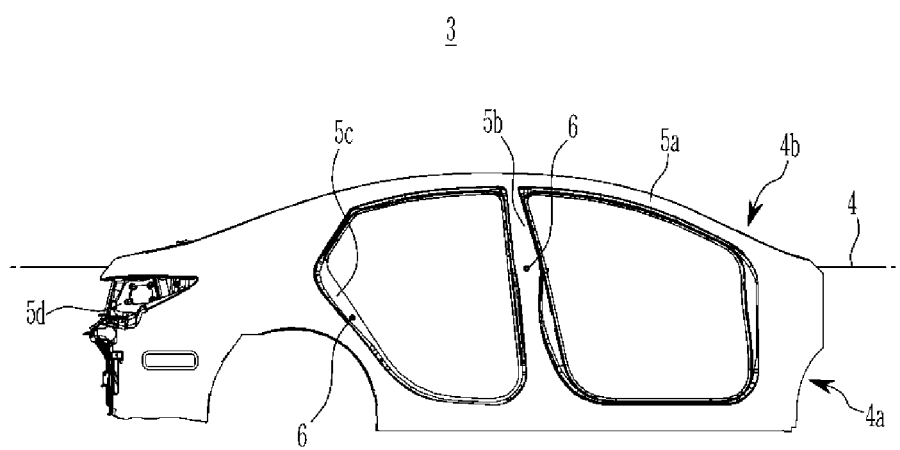
FIG. 3 exemplarily illustrates a side assembly applied to the vehicle body assembly system according to the exemplary embodiment of the present disclosure.

Meanwhile, in the exemplary embodiment of the present disclosure, as shown in FIG. 3, each side assembly 3 may be divided into a lower portion 4a and an upper portion 4b with reference to a dotted reference line 4. The side assembly 3 may form a front pillar 5a, a center pillar 5b, a rear pillar 5c, and a rear combination lamp portion 5d. Further, the side assembly 3 may form at least one reference aperture 6.

Figure 4:
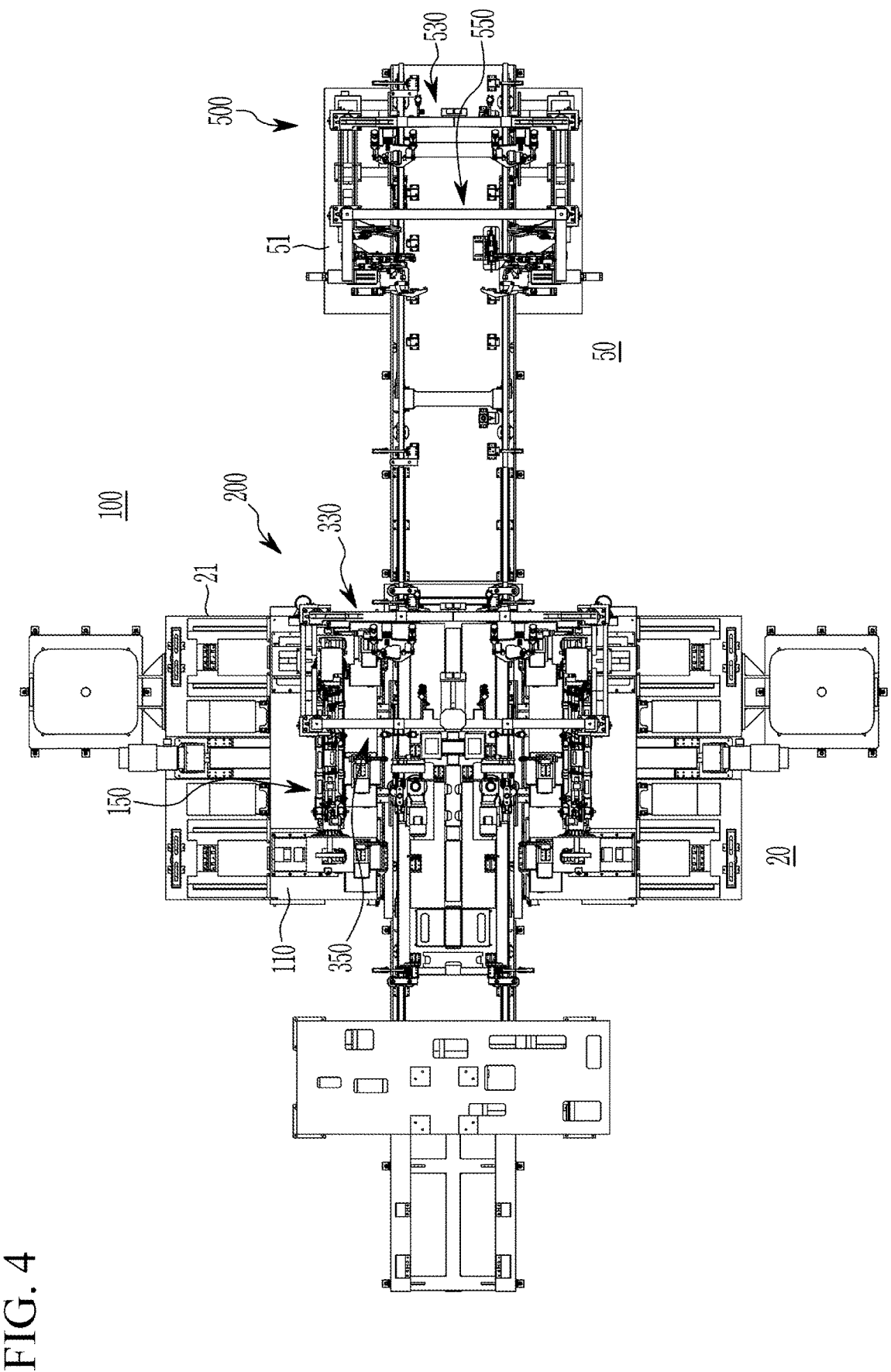
FIG. 4 is a plan schematic diagram of the vehicle assembly system according to the exemplary embodiment of the present disclosure.
Figure 5:
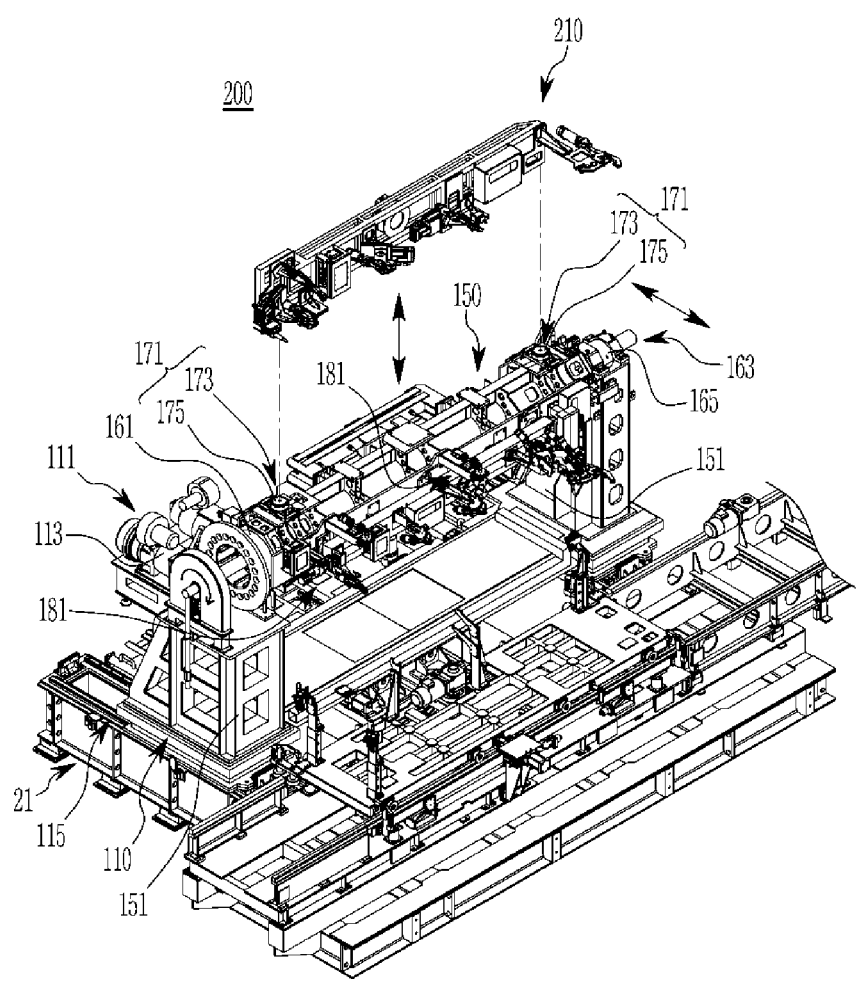
FIG. 5 is a perspective view of a part of a pre-buck unit applied to the vehicle body assembly system according to the exemplary embodiment of the present disclosure.

FIG. 4 is a plan schematic diagram of the vehicle body assembly system according to the exemplary embodiment of the present disclosure, and FIG. 5 is a perspective view of a part of the pre-buck unit applied to the vehicle body assembly system according to the exemplary embodiment of the present disclosure. Referring to FIG. 4 and FIG. 5, together with FIG. 1 to FIG. 3, the pre-buck unit 200 according to the exemplary embodiment of the present disclosure may be formed with a structure that regulates the lower portion of the side assembly 3, and key-welds the lower portion of the side assembly 3 to the floor assembly 2 while more accurately matching the side assemblies 3 at predetermined positions of the opposite sides of the floor assembly 2.

Further, the pre-buck unit 200 may be formed with a structure capable of minimizing the distribution of position (assembly) of the side assembly 3 to be matched to opposite sides of the floor assembly 2. Thus, the pre-buck unit 200 may include a moving member 110, a rotation index 150, and a side hanger 210. The moving member 110 may be reciprocally movable with respect to opposite sides of the floor assembly 2 by operation of a first driver 111 in a pre-buck frame 21 at opposite sides of the transport path of the pre-buck section 20.

For example, the moving member 110 may be formed in the shape of a plate, and may be reciprocally movable in a vehicle width direction by the first driver 111 on the top surface of the pre-buck frame 21. In particular, the first driver 111 may be configured to reciprocally move the moving member 110 along the vehicle width direction. The first driver 111 may be configured to reciprocally move the moving member 110 along the vehicle width direction through a first guide structure 115 of a prior art, which includes a lead (or ball) screw that converts a torque of a first servo motor 113 to linear motion.

The first driver 111 described above may include a motorized driven body or mobile device of a well-known prior art, and thus a detailed description of its configuration will be omitted in this specification. The rotation index 150 may include a plurality of side hangers 210 that correspond to side assemblies 3 that are different according to a vehicle model, and matches side assemblies 3 to positions set at the opposite sides of the floor assembly 2 through a side hanger 210 while selecting a side hanger 210 of the corresponding vehicle model in a rotation manner.

The rotation index 150 may be reciprocally movable in the vehicle width direction through the moving member 110, and may be tiltably rotatable at a predetermined angle on the moving member 110. The rotation index 150 may include an index frame 151, a rotor 161, a hanger coupling portion 171, and a first clamper 181. The index frame 151 is provided for rotatably installing the rotor 161, which will be described in detail later, and may be provided as a pair with each disposed at a distance from each other in the vehicle body transport direction on the moving member 110. The index frames 151 may be formed in a structure in which a plurality of metal bars are connected with the vehicle body transport direction, the vehicle width direction, and the vehicle height direction, and may be installed upright on the moving member 110 at regular intervals along the vehicle body transport direction.

The rotor 161 may couple the side hanger 210, which will be described in detail later, and is rotatably installed in the index frame 151 while having four sides capable of detachably replacing the side hangers 210 that are different for each vehicle model. Opposite ends of the rotor 161 may be rotatably supported by the index frame 151, and may be configured to rotate at a predetermined degree (e.g., about 90 degrees) by operation of a second driver 163. For example, the second driver 163 may include a second servo motor 165 be fixed to the index frame 151.

The hanger coupling portion 171 may be pin-coupled with the side hanger 210, and may be provided in plural in each side of the rotor 161 (e.g., a hanger coupling portion may be provided in each side of the rotor). Each hanger coupling portion 171 may be pin-coupled with pins provided in the side hanger 210 and may clamp the pins. The hanger coupling portion 171 may include a first docking clamp 173 where the pin provided in the side hanger 210 is fitted and coupled. The first docking clamp 173 may include a ball clamp of a prior art capable of clamping the pin inserted in a first pin housing 175 with a plurality of balls (not shown in the drawing) and air pressure. The hanger coupling portion 171 is formed of the ball clamp of the prior art, and thus no further detailed description will be provided in the present specification.

The first damper 181 may fix the side hanger 210 of the rotor 161 to the rotor 161, and may be provided in plural in each side of the rotor 161 (e.g., a first damper may be disposed in each side of the rotor). The first dampers 181 may be disposed at opposite sides of each surface of the rotor 161. For example, the first damper 181 may be operated back and forth by a pneumatic cylinder, and may be provided as a pin damper to be pin-coupled to the side hanger 210.

Figure 6:
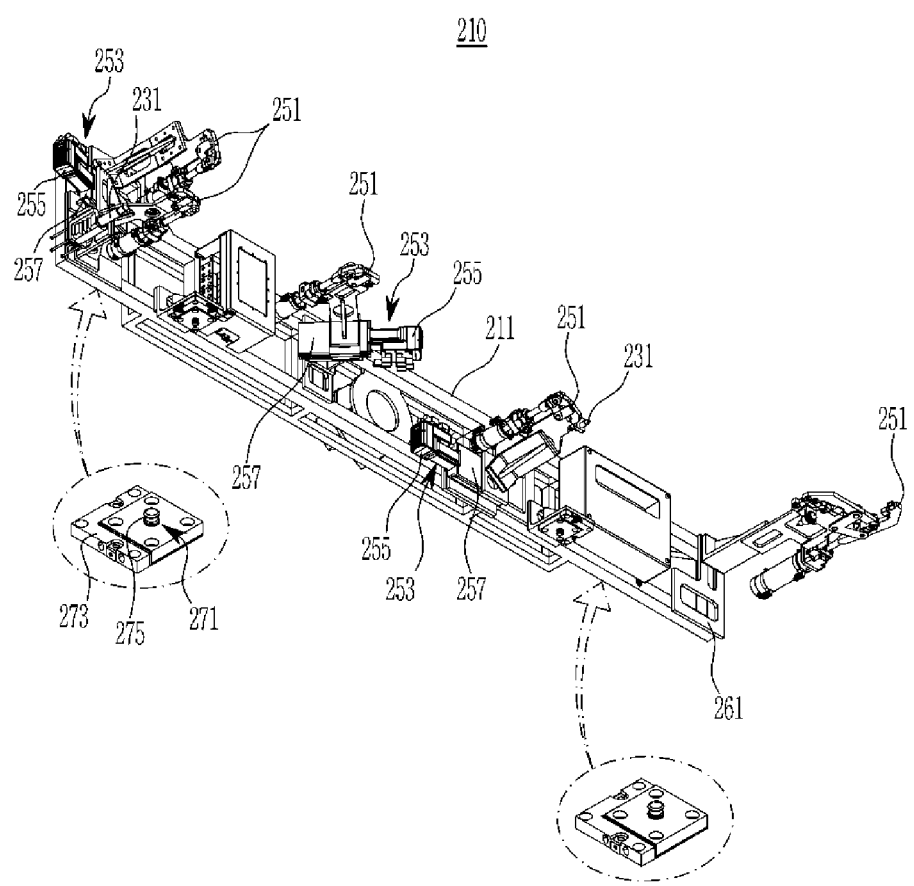
FIG. 6 and FIG. 7 are perspective views of the side hanger applied to the vehicle body assembly system according to the exemplary embodiment of the present disclosure.
Figure 7:
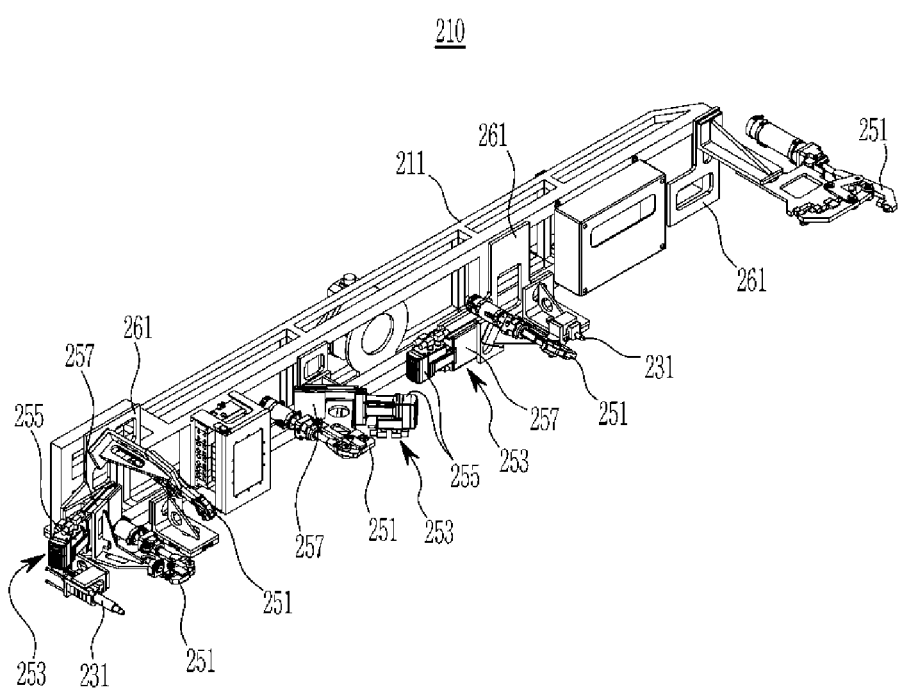

FIG. 6 and FIG. 7 are perspective views of the side hanger applied to the vehicle body assembly system according to the exemplary embodiment of the present disclosure. Referring to FIG. 6 and FIG. 7, together with FIG. 1 to FIG. 5, the side hanger 210 in the exemplary embodiment of the present disclosure may clamp or grip the lower portion 4a of the side assembly 3, which is different for each vehicle type, and may be configured to regulate the vehicle transport direction and the height direction of the side assembly 3.

In particular, the side hanger 210 may be provided as a common hanger (e.g., a common hanger of two models of vehicles) that may regulate the position of the lower portion 4a of the side assembly 3 differently for each vehicle model. The side hanger 210 may be detachably provided in a first handling robot 281 in the pre-buck section 20, and may be coupled (e.g., detachable/attachable) to the rotor 161 of the rotation index 150 through the first handling robot 281. In particular, the side hanger 210 may be configured to regulate the lower portion 4a of the side assembly 3 aligned to a predetermined position using a separate aligning means in the pre-buck section 20. For this, a robot hanger not shown in the drawing may be included in the exemplary embodiment of the present disclosure.

The robot hanger may unload the side assembly 3 transported to the pre-buck section 20 through a transport hanger (not shown in the drawing), and may load the side assembly 3 to the side hander 210 in a robot-to-robot manner while aligning the side assembly 3 to the predetermined position using an alignment jig (not shown in the drawing). The side hanger 210 may include a hanger frame 211, a reference pin 231, second dampers 251, and a first coupling pin 271.

Particularly, the hanger frame 211 may be mounted to an arm front end of the first handling robot 281 disposed in the pre-buck section 20. The hanger frame 211 may be mounted to or separated from the arm front end of the first handling robot 281 using a tool changer. The reference pin 231 may hold a reference position of the side assembly 3, and as at least one thereof may be installed at the hanger frame 211. The reference pin 231 may be fitted into the reference aperture 6 of the side assembly 3 as shown in FIG. 3.

The reference pin 231 may be fitted into the reference aperture 6 of the side assembly 3 while moving front and back at a front side of the hanger frame 211 by a driving means of the reference pin 231. Further, the reference pin 231 may be formed to be movable in three-axis directions of a vehicle body transport direction, a vehicle width direction, and a height direction by a driving means that corresponds to a reference aperture 6 of a side assembly 3 which is different for each vehicle model.

The second damper 251 may clamp only the lower portion 4a of the side assembly 3 and regulate the vehicle body transport direction and height direction of the side assembly 3. The second damper 251 may be provided in plural in the hanger frame 211. The plurality of second dampers 251 may clamp the lower portion 4a of the side assembly 3 by the operation of a clamping cylinder. The second clampers 251 may be disposed at opposite ends of the hanger frame 211 and between the opposite ends. The second dampers 251 disposed at the opposite ends of the hanger frame 211 may clamp a front side and a rear side (e.g., rear combination lamp portion) of the side assembly 3. The second dampers 251 at the opposite ends of the hanger frame 211 may be fixed to the opposite ends of the hanger frame 211.

In addition, the plurality of second dampers 251 disposed between the opposite ends of the hanger frame 211 may clamp a front pillar 5a, a center pillar 5b, and a rear pillar 5c of the side assembly 3 as shown in FIG. 3. Particularly, the second dampers 251 that correspond to the front pillar 5a, the center pillar 5b, and the rear pillar 5c of the side assembly 3 may be reciprocally movable along the vehicle body transport direction in a variable positioning manner by a third driver 253.

Furthermore, the third driver 253 may be configured to to move the second dampers 251 in the vehicle body transport direction according to positions of the pillar portions of the side assembly 3 that are different for each vehicle model. For example, the third driver 253 may be configured to reciprocally move the second damper 251 in the vehicle body transport direction through a second guide structure 257 of a prior art, provided with a lead (or ball) screw that converts torque of a third servo motor 255 to straight line movement, a guide rail, and the like. In particular, the second dampers 251 may be installed in a triangular structure on the hanger frame 211 to stably grip the lower part of the side assembly 3 with reference to the center of the side assembly 3.

Additionally, the hanger frame 211 may form a plurality of mounting seats 261 for additionally mounting the second dampers 251 in response to different side assemblies 3 for each vehicle model. The mounting seat 261 include the above-stated fixed and/or position variable model second dampers 251 that correspond to different side assemblies 3 for each vehicle model. The first coupling pin 271 may couple (e.g., detach/attach) the hanger frame 211 to the rotor 161 of the rotation index 150, which regulates the lower portion 4a of the side assembly 3 through the second dampers 251.

The first coupling pin 271 may be provided in plural below a rear side of the hanger frame 211. The first coupling pin 271 may be mounted below the rear side of the hander frame 211 through a first mounting bracket 273. The first coupling pin 271 may protrude toward a lower side direction in the first mounting bracket 273. Additionally, the first coupling pin 271 formed in the shape of a cylinder may form a rounded first ball coupling groove 275 along a circumference direction thereof. The first coupling pin 271 may be coupled with the first docking clamp 173 of the above-stated hanger coupling portion 171. In particular, when the first coupling pin 271 is coupled to the first pin housing 175, the first docking clamp 173 may rigidly fix the first coupling pin 271 to the first pin housing 175 while balls are coupled to the first ball coupling groove 275 by air pressure.

Figure 8:
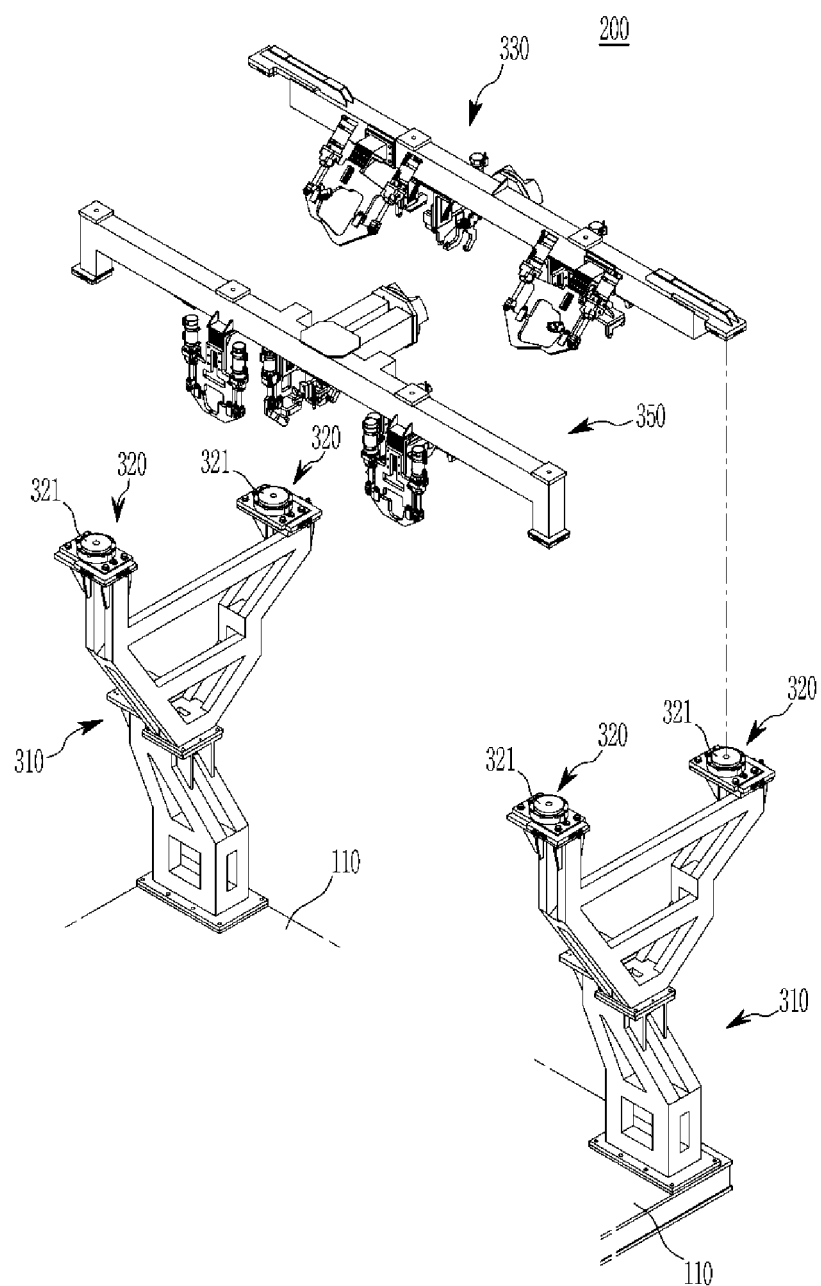
FIG. 8 is perspective view of another part of the pre-buck unit applied to the vehicle body assembly system according to the exemplary embodiment of the present disclosure.

FIG. 8 is perspective view of another part of the pre-buck unit applied to the vehicle body assembly system according to the exemplary embodiment of the present disclosure. Referring to FIG. 4 and FIG. 8, together with FIG. 1 to FIG. 3, the pre-buck unit 200 according to the exemplary embodiment of the present disclosure has a structure in which the cowl 7 and the front roof rail 8a may be regulated, and the upper portion of the side assembly 3, the cowl 7, and the front roof rail 8a may be key-welded while the cowl 7 and the front roof rail 8a may be matched to predetermined positions in the upper portion of the side assembly 3.

Thus, the pre-buck unit 200 may include a first post frame 310, a first gripper 330, and a second gripper 350. The first post frame 310 may couple first and second grippers 330 and 350, which will be described later, and may be respectively fixed to top sides of the moving members 110 at opposite sides of the vehicle body transport path. For example, the first post frame 310 may be provided in the form of a Y-shaped frame of which a front side (hereinafter referred to as one side or a first side) is lower than a rear side (hereinafter referred to as the other side or a second side).

Particularly, second docking clamps 320 that are pin-coupled with pins respectively provided in a first gripper 330 and a second gripper 350, which will be described in more detail, may be disposed in a first side and a second side of the first post frame 310. The second docking clamp 320 may be provided as a ball clamp of a prior art, which may clamp a pin fitted in a second pin housing 321 with a plurality of balls (not shown in the drawing) and air pressure.

Figure 9:
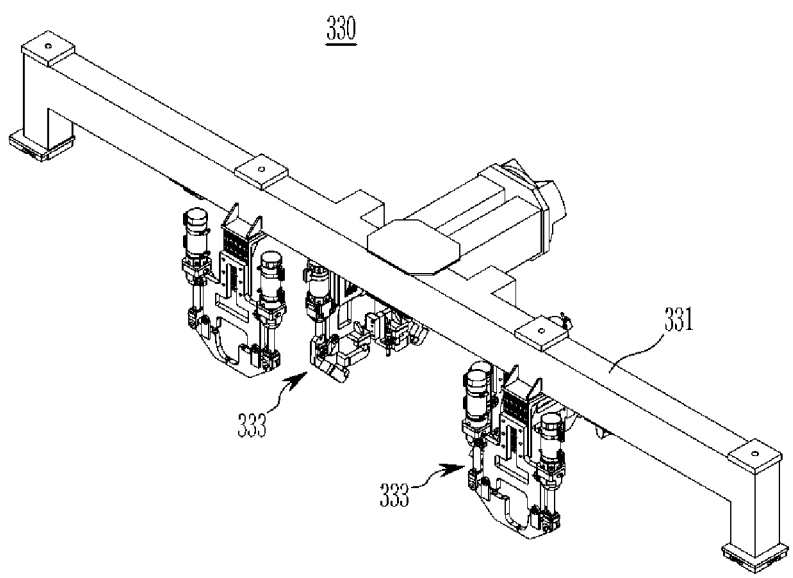
FIG. 9 and FIG. 10 are perspective views of a first gripper of the pre-buck unit applied to the vehicle body assembly system according to the exemplary embodiment of the present disclosure.
Figure 10:
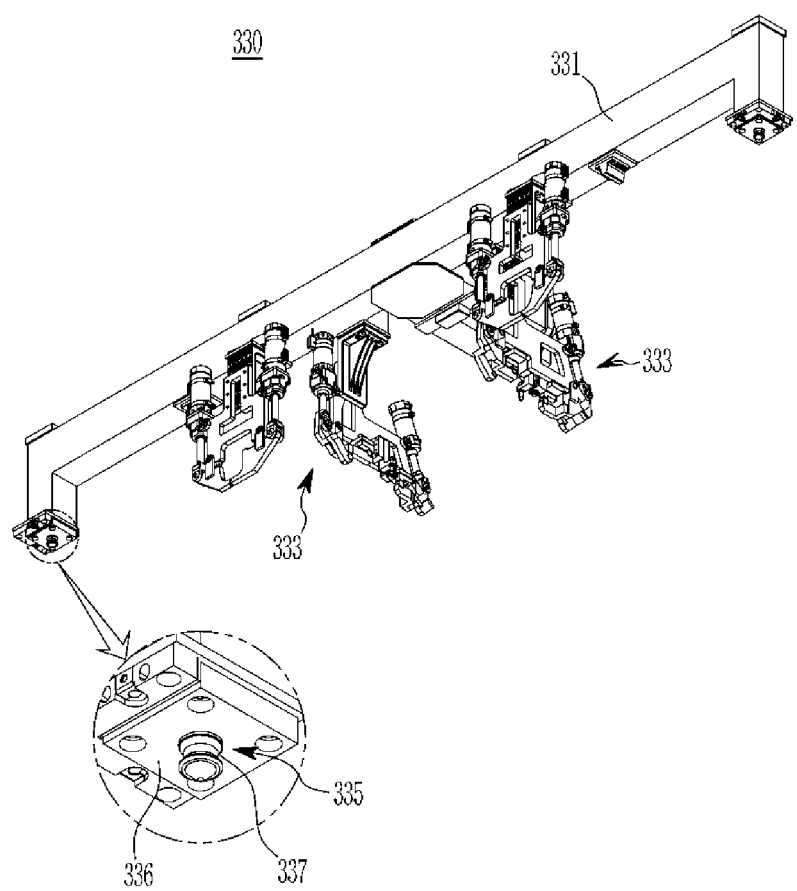

The first gripper 330 may be configured to regulate the cowl 7 and an upper portion of the side assembly 3, and may be detachably provided in a second handling robot 325 (refer to FIG. 1) and may be coupled to a first side of the first post frame 310. In other words, the first gripper 330 may be detachably disposed in a first side of the first post frame 310 using the second handling robot 325. The first gripper 330 may include, as shown in FIG. 9 and FIG. 10, a first gripper frame 331, third dampers 333, and a second coupling pin 335.

The first gripper frame 331 may be detachably provided at an arm front end of the second handling robot 325 disposed in the pre-buck section 20. The first gripper frame 331 may be mounted to the arm front end of the second handling robot 325 or separated from the arm front end of the second handling robot 325 using a tool changer. The third dampers 333 may be disposed in the first gripper frame 331 and may clamp the upper portion of the side assembly 3 and the cowl 7. In particular, the third dampers 333 may clamp the upper portion of the side assembly 3 and the cowl 7 by operation of a clamping cylinder.

Additionally, the second coupling pin 335 may couple (e.g., detach/attach) the first gripper frame 331 that clamps the cowl 7 to the first side of the first post frame 310 by operation of the third dampers 333. Since the second coupling pins 335 may be coupled with the second docking clamps 320 provided at the first side of the first post frame 310, the second coupling pins 335 may be provided at opposite ends of the first gripper 331. The second coupling pins 335 may be mounted to opposite ends of the first gripper frame 331 through a second mounting bracket 336. The second coupling pin 335 may be disposed in the second mounting bracket 336 to protrude toward a lower side direction.

The second coupling pin 335 formed in the shape of a cylinder may form a rounded second ball coupling groove 337 along a circumference direction thereof. The second coupling pin 335 may be coupled with the second docking clamp 320. In particular, when the second coupling pin 335 is coupled to the second pin housing 321, the second docking clamp 320 may rigidly fix the second coupling pin 335 to the second pin housing 321 while balls are coupled to the second ball coupling groove 337 by air pressure.

Figure 11:
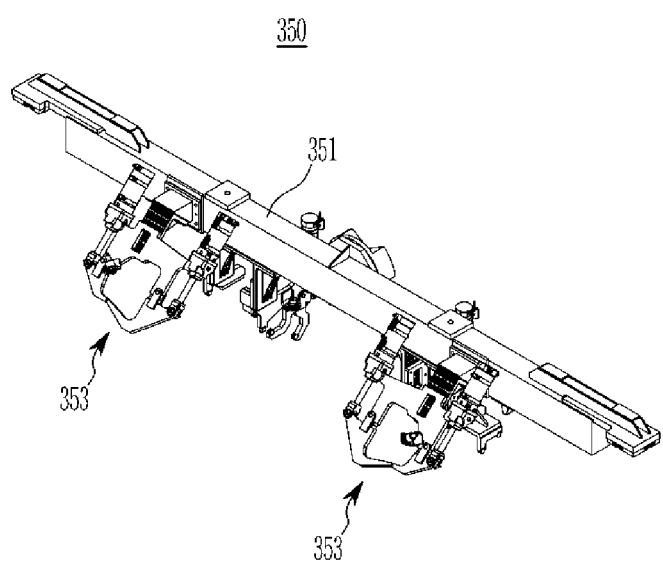
FIG. 11 and FIG. 12 are perspective views of a second gripper of the pre-buck unit applied to the vehicle body assembly system according to the exemplary embodiment of the present disclosure.
Figure 12:
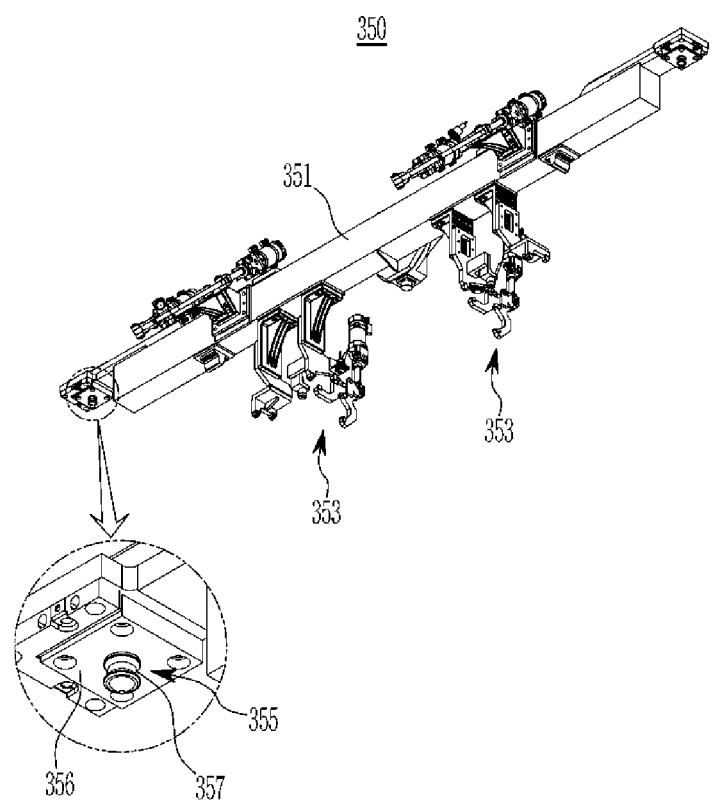

Further, the second gripper 350 may be configured to regulate the front roof rail 8a and the upper portion of the side assembly 3, and may be detachably provided in a third handling robot 345 (hereinafter referred to FIG. 1) and may be coupled to the second side of the first post frame 310. In other words, the second gripper 350 may be detachably/attachably disposed in the second side of the first post frame 310 of the third handling robot 345. The second gripper 350 may include, as shown in FIG. 11 and FIG. 12, a second gripper frame 351, fourth clampers 353, and a third coupling pin 355.

The second gripper frame 351 may be detachably provided at an arm front end of the third handling robot 345 disposed in the pre-buck section 20. The second gripper frame 351 may be mounted to or separated from the arm front end of the third handling robot 345 using a tool changer. The fourth dampers 353 clamp the upper portion of the side assembly 3 and the front roof rail 8a and may be installed in the second gripper frame 351. The fourth dampers 353 may clamp the upper portion of the side assembly 3 and the front roof rail 8a through the operation of the clamping cylinder.

The third coupling pin 355 may couple (e.g., detach/couple) the second gripper frame 351 that clamps the front roof rail 8a by the fourth dampers 353 to the second side of the first post frame 310. The third coupling pin 355 may be coupled with a second docking clamp 320 provided at the second side of the first post frame 310, and thus the third coupling pins 355 may be installed at opposite ends of the second gripper frame 351. The third coupling pins 355 may be mounted to the opposite ends of the second gripper frame 351 through third mounting brackets 356. The third coupling pin 355 may be disposed to protrude in a downward direction in the third mounting bracket 356.

The third coupling pin 355 formed in the shape of a cylinder may form a rounded third ball coupling groove 357 along a circumference direction thereof. The third coupling pin 355 may be coupled with the second docking clamp 320. In particular, when the third coupling pin 355 is coupled to the second pin housing 321, the second docking clamp 3203 may rigidly fix the third coupling pin 355 to the second pin housing 321 while balls are coupled to the third ball coupling groove 357 by air pressure.

Meanwhile, referring to FIG. 1, the pre-buck unit 200 according to the exemplary embodiment of the present disclosure may further include first welding robots 410 installed in the pre-buck section 20. The first welding robots 410 may key-weld the lower portion of the side assembly 3 and the floor assembly 2 in the pre-buck section 20. In addition, the first welding robots 410 may key-weld the cowl 7, the front roof rail 8a, and the upper portion of the side assembly 3 in the pre-buck section 20.

The first welding robots 410 may key-weld the lower portion of the side assembly 3 and the floor assembly 2 while the side assemblies 3 are regulated by the side hangers 210 with respect to the opposite sides of the floor assembly 2. In addition, the first welding robots 410 may key-weld the upper portion of the side assembly 3, the cowl 7, and the front roof rail 8a while the cowl 7 and the front roof rail 8a are respectively regulated by the first and second grippers 330 and 350 with respect to the upper portion of the side assembly 3.

The first welding robots 410 may be provided in plural along the vehicle body transport direction in the pre-buck section 20, and a spot welding device may be mounted to a front arm end of each robot. Each first welding robot 410 may be formed of a spot welding robot of a well-known prior art, and thus no further detailed description will be provided in the present specification.

Figure 13:
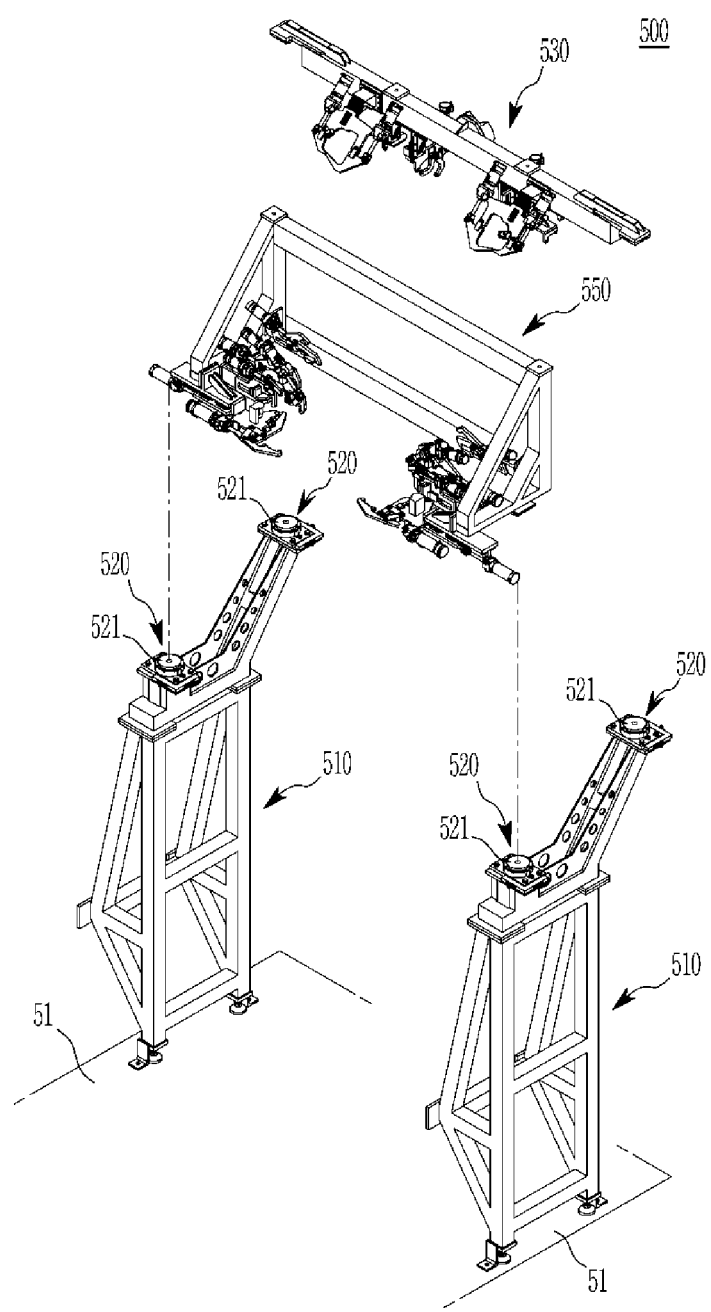
FIG. 13 is a perspective view of a main-buck unit applied to the vehicle body assembly system according to the exemplary embodiment of the present disclosure.

Hereinafter, the main-buck unit 500 of the vehicle body assembly system 100 according to the exemplary embodiment of the present disclosure will be described in detail. FIG. 13 is a perspective view of the main-buck unit applied to the vehicle body assembly system according to the exemplary embodiment of the present disclosure.

Referring to FIG. 13, together with FIG. 1 to FIG. 4, the main-buck unit 500 according to the exemplary embodiment of the present disclosure is provided to post-assemble a rear roof rail 8b and a package tray 9 as vehicle parts to the side assembly 3 transported to the main-buck section 50 through the vehicle transfer line 1 from the pre-buck section 20. The main-buck unit 500 may be configured to regulate the rear roof rail 8b and the package tray 9, respectively, with respect to the upper portion of the side assembly 2 pre-assembled by the pre-buck unit 200.

In addition, the main-buck unit 500 may key-weld the upper portion of the side assembly 3, the rear roof rail 8b, and the package tray 9 while matching the rear roof rail 8b and the package tray 9 to predetermined positions in the upper portion of the side assembly 3. The main-buck unit 500 may be disposed at opposite sides of the transport path of the vehicle transfer line 1 in the main-buck section 50. The main-buck unit 500 may include a second post frame 510, a third gripper 530, a fourth gripper 550, and a second welding robot 610 (refer to FIG. 1).

The second post frame 510 may couple the third and fourth grippers 530 and 550, which will be described in detail later, and may be fixed to main-buck frames 51 at the opposite sides of the transport path in the main-buck section 50. For example, the second post frame 510 may be provided as a frame of which a front side (hereinafter referred to as one side or a first side) is higher than a rear side (hereinafter referred to as the other side or a second side). IN particular, one side and the other side of the second post frame 510 may include third docking clamps 520 that are pin-coupled with pins respectively provided in the third gripper 530 and the fourth gripper 550, which will be described in further detail later.

The third docking clamp 520 may include a ball clamp of a prior art capable of clamping the pin inserted in a third pin housing 521 with a plurality of balls (not shown in the drawing) and air pressure. The third gripper 530 may be configured to regulate the rear roof rail 8b and the upper portion of the side assembly 3, and may be detachably provided in a fourth handling robot 525 (refer to FIG. 1) and may be coupled to a first side of the second post frame 510. In other words, the third gripper 530 may detachable/attachable to the first side of the second post frame 510 through the fourth handling robot 525.

Figure 14:
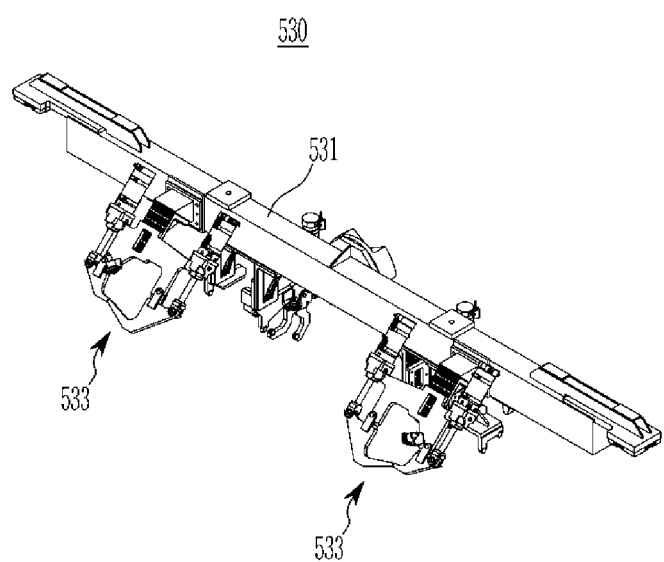
FIG. 14 and FIG. 15 are perspective views of a third gripper of the main-buck unit applied to the vehicle body assembly system according to the exemplary embodiment of the present disclosure.
Figure 15:
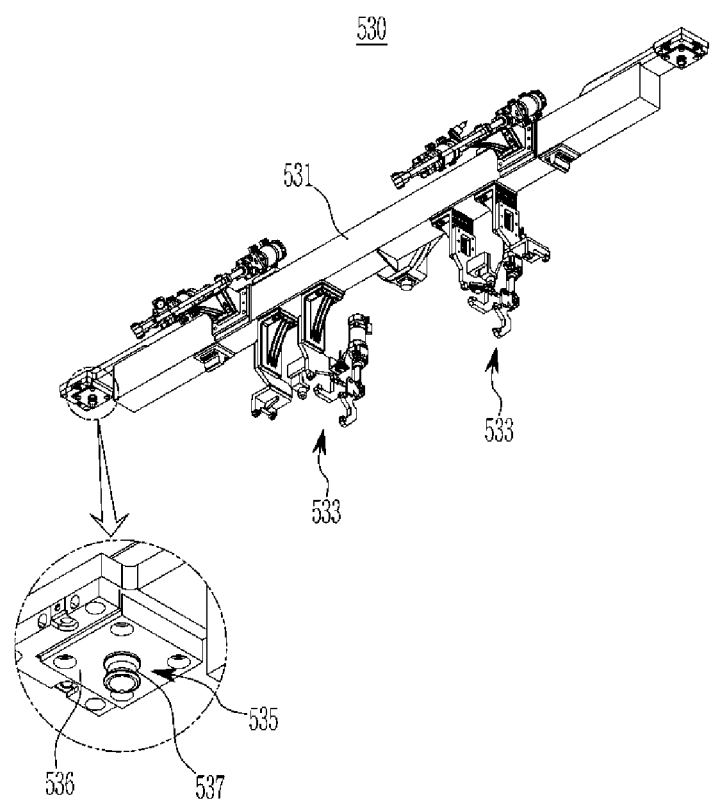

As shown in FIG. 14 and FIG. 15, the third gripper 530 may include a third gripper frame 531, fifth dampers 533, and a fourth coupling pin 535. The third gripper frame 531 may be detachably provided at an arm front end of the fourth handling robot 525 disposed in the main-buck section 50. The third gripper frame 531 may be mounted to the arm front end of the fourth handling robot 525 or separated from the arm front end of the fourth handling robot 525 using a tool changer. The fifth dampers 533 may be provided in the third gripper frame 531 to clamp the upper portion of the side assembly 3 and the rear roof rail 8b. The fifth dampers 533 may clamp the upper portion of the side assembly 3 and the rear roof rail 8b through operation of a clamping cylinder.

The fourth coupling pin 535 may couple (e.g., detach/attach) the third gripper frame 531 that clamps the rear roof rail 8b through the fifth dampers 533 to the first side of the second post frame 510. The fourth coupling pin 535 may be coupled with the third docking clamp 520 provided at the first side of the second post frame 510 and thus installed at opposite ends of the third gripper frame 531. The fourth coupling pins 535 may be mounted to opposite ends of the third gripper frame 531 through fourth mounting brackets 536. The fourth coupling pin 535 may protrude in a downward direction in the fourth mounting bracket 536. The fourth coupling pin 535 formed in the shape of a cylinder may form a rounded fourth ball coupling groove 537 along a circumference direction thereof. The fourth coupling pin 535 may be coupled with the third docking clamp 520.

In particular, when the fourth coupling pin 535 is coupled to the third pin housing 521, the third docking clamp 520 may rigidly fix the fourth coupling pin 535 to the third pin housing 521 while balls are coupled to the fourth ball coupling groove 537 by air pressure. The fourth gripper 550 may be configured to regulate the package tray 9 and the upper portion of the side assembly 3, and may be detachably coupled to a fifth handling robot 545 (refer to FIG. 1) and may be coupled to the second side of the second post frame 510. In other words, the fourth gripper 550 may bed detachably/attachably provided in the second side of the second post frame 510 by operation of the fifth handling robot 545.

Figure 16:
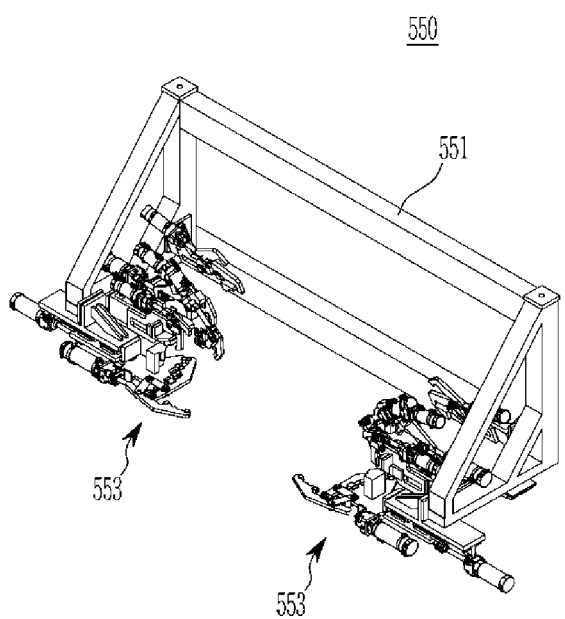
FIG. 16 and FIG. 17 are perspective views of a fourth gripper of the main-buck unit applied to the vehicle body assembly system according to the exemplary embodiment of the present disclosure.
Figure 17:
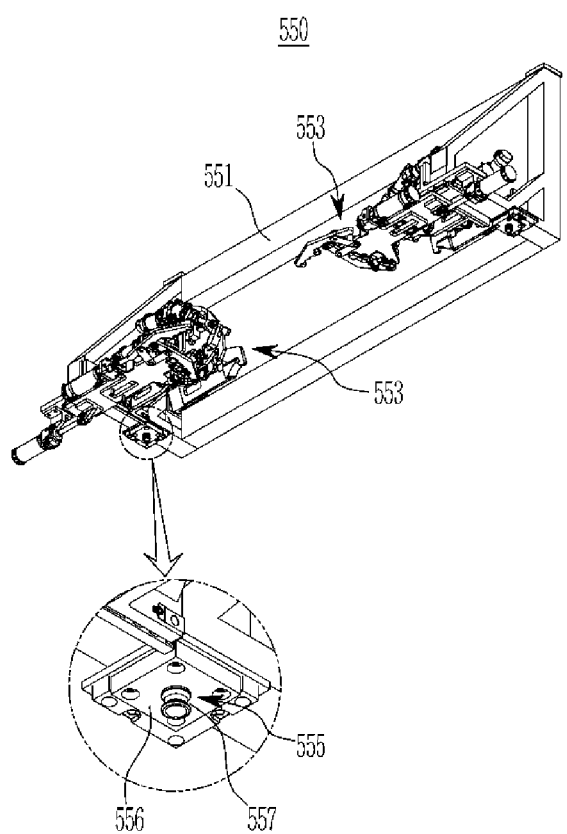

The fourth gripper 550 may include, as shown in FIG. 16 and FIG. 17, a fourth gripper frame 551, sixth dampers 553, and a fifth coupling pin 555. The fourth gripper frame 551 may be detachably provided at an arm front end of the fifth handling robot 545 disposed in the main-buck section 50. The fourth gripper frame 551 may be mounted to or separated from the arm front end of the fifth handling robot 545 using a tool changer.

The sixth dampers 553 may be disposed in the fourth gripper frame 551 to clamp the upper portion of the side assembly 3 and the package tray 9. The sixth clampers 553 may clamp the upper portion of the side assembly 3 and the package tray 9 through operation of a clamping cylinder. The fifth coupling pin 555 may couple (e.g., detach/attach) the fourth gripper frame 551 that clamps the package tray 9 through the sixth dampers 553 to the second side of the second post frame 510.

The fifth coupling pin 555 may be disposed at opposite ends of the fourth gripper frame 551 and may thus be coupled with the third docking clamps 520 provided at the second side of the second post frame 510. The fifth coupling pins 555 may be mounted to opposite ends of the fourth gripper frame 551 through a fifth mounting bracket 556. The fifth coupling pin 555 may protrude in a downward direction in the fifth mounting bracket 556. The fifth coupling pin 555 formed in the shape of a cylinder may form a rounded fifth ball coupling groove 557 along a circumference direction thereof. Additionally, the fifth coupling pin 555 may be coupled with the third docking clamp 520. When the fifth coupling pin 555 is coupled to the third pin housing 521, the third docking clamp 520 may rigidly fix the fifth coupling pin 555 to the third pin housing 521 while balls are coupled to the fifth ball coupling groove 557.

The second welding robots 610 may key-weld the rear roof rail 8b, the package tray 9, and the upper portion of the side assembly 3 in the main-buck section 50. The second welding robots 610 may key-weld the upper portion of the side assembly 3, the rear roof rail 8b, and the package tray 9 while respectively regulating the rear roof rail 8b and the package tray 9 to the third and fourth grippers 530 and 550 with respect to the upper portion of the side assembly 3. The second welding robots 610 may be installed in plural along the vehicle body transport direction in the main-buck section 50, and may each include a spot welding device mounted to an arm front end of the robot. Each second welding robot 610 may be formed of a spot welding robot of a well-known prior art, and thus no further detailed description will be provided in the present specification.

Meanwhile, referring to FIG. 1, the vehicle body assembly system 100 according to the exemplary embodiment of the present disclosure may further include a first storage portion 810 and a second storage portion 820. The first storage portion 810 may be configured to store the side hangers 210, the first grippers 330, and the second grippers 350, which are different for each vehicle model, in the pre-buck section 20, and may be installed in the pre-buck section 20.

The side hangers 210, the first gripper 330, and the second gripper 350 stored in the first storage portion 810 may be taken out or accessed by the handling robot in the pre-buck section 20. In addition, the second storage portion 820 may be configured to store the third grippers 530 and the fourth grippers 550, which are different for each vehicle model, in the main-buck section 50, and may be installed in the main-buck section 50. As described above, the third grippers 530 and the fourth grippers 550 stored in the second storage portion 820 may be taken out through the handling robot in the main-buck section 50.

Hereinafter, operation of the vehicle body assembly system 100 and an assembly process of the vehicle body according to the exemplary embodiment of the present disclosure will be described in detail. First, in the exemplary embodiment of the present disclosure, the floor assembly 2 assembled through a sub-assembly line may be transported to the pre-buck section 20 along the predetermined transport path through the vehicle transfer line 1.

In this process, the moving members 110 at opposite sides of the transport path in the pre-buck section 20 are in a backward-moved state in a direction (i.e., the vehicle width direction) away from the transport path together with the rotation index 150 by operation of the first driver 111. In addition, the first handling robot 281 may be equipped with a side hanger 210 of a predetermined vehicle model on the front end of the arm in the pre-buck section 20. Accordingly, in the exemplary embodiment of the present disclosure, a side assembly 3 of a predetermined vehicle model may be transported to the pre-buck section 2 through a transport hanger (not shown in the drawing), and the side assembly 3 may be provided to a robot hanger (not shown in the drawing) from the transport hanger.

Further, in the exemplary embodiment of the present disclosure, the side assembly 3 may be loaded to the side hanger 210 of the first handling robot 218 from the robot hanger through a robot-to-robot method. The side hanger 210 may then regulate (clamps) the lower portion 4a of the side assembly 3 using the second dampers 251. The reference pin 231 of the side hanger 210 may be fitted into the reference aperture 6 of the side assembly 3, and hold the reference position of the side assembly 3. In addition, the second dampers 251 of the side hanger 210 may clamp the lower portion 4a of the side assembly 3. In particular, the second dampers 251 provided at the opposite ends of the hanger frame 221 of the side hanger 210 may clamp a front side and a rear side (i.e., a rear combination lamp portion) of the side assembly 3.

Additionally, the second dampers 251 disposed between the opposite ends of the hanger frame 211 may respectively clamp the front pillar 5a, the center pillar 5b, and the rear pillar 5c of the side assembly 3. In particular, the second dampers 251 disposed between the opposite ends of the hanger frame 211 may respectively clamp the front pillar 5a, the center pillar 5b, and the rear pillar 5c while being moved in the vehicle body transport direction by the third driver 253 according to the position of the pillar portion of a different side assembly 3 for each vehicle model.

In the exemplary embodiment of the present disclosure, the second clamper 251 may be additionally mounted to the mounting seat 261 of the hanger frame 211 in response to a different side assembly 3 for each vehicle model. In such a state, the side hanger 210, which regulates the side assembly 3, may be transported to the rotation index 150 on the moving member 110 by the first handling robot 281 in the exemplary embodiment of the present disclosure. The side hanger 210 may then be coupled to the rotor 161 of the rotation index 150 by the first handling robot 281 in the exemplary embodiment of the present disclosure Additionally, the first coupling pin 271 of the side hanger 210 may be coupled to the first docking clamp 173 of the hanger coupling portion 171 provided in the rotor 161. IN particular, the first docking clamp 173 may couple the first coupling pin 271 through the first pin housing 175, and the first docking clamp 173 may rigidly fix the first coupling pin 271 to the first pin housing 175 while balls are coupled to the first ball coupling groove 275 of the first coupling pin 271 by air pressure.

Further, in the exemplary embodiment of the present disclosure, the arm of the first handling robot 281 may be separated from the side hanger 210, may rotate the rotor 161 at a predetermined angle (e.g., about 90 degrees) by operation of the second driver 163, and may dispose the side assembly 3 regulated by the side hanger 210 in a direction that faces the opposite sides of the floor assembly 2 by operation of the rotor 161. Then, the lower part of the side assembly 3 may be accurately matched to a predetermined position on both sides of the floor assembly 2 while the moving member 110 is moved forward to the opposite sides of the floor assembly 2 along the vehicle width direction by driving of the first driver 111.

In such a process, the first gripper 330 may be mounted to the arm front end of the second handling robot 325 in the pre-buck section 20. In addition, the second gripper 350 may be mounted to the front arm end of the third handling robot 345. Further, the first gripper 330 may be configured to regulate (clamp) the cowl 7 to a predetermined position through the third dampers 333, and the second gripper 350 may be configured to regulate (clamp) the front roof rail 8a to a predetermined position using the fourth dampers 353.

In the exemplary embodiment of the present disclosure, as described above, the second coupling pin 335 of the first gripper frame 331 may be coupled to the second docking clamp 320 of the first post frame 310 by the second handling robot 325 while the lower portion of the side assembly 3 is matched to a predetermined position on the opposite sides of the floor assembly 2. In particular, the second docking clamp 320 may couple the second coupling pin 335 through the second pin housing 321, such that the second docking clamp 320 may rigidly fix the second coupling pin 335 to the second pin housing 321 while coupling balls to the second ball coupling groove 337 of the second coupling pin 335 by air pressure.

In addition, in the exemplary embodiment of the present disclosure, the third coupling pin 335 of the second gripper frame 351 may be coupled to the second docking clamp 320 at the second side of the first post frame 310 by the third handling robot 345. Particularly, the second docking clamp 320 may couple the third coupling pin 355 through the second pin housing 321, and in this case, the second docking clamp 320 may rigidly fix the third coupling pin 357 to the second pin housing 321 while coupling balls to the third ball coupling groove 337 of the third coupling pin 355 by air pressure.

Accordingly, in the exemplary embodiment of the present disclosure, the cowl 7 and the front roof rail 8a may be accurately matched to predetermined positions on the upper portion of side assembly 3 while the cowl 7 and the front roof rail 8a are respectively regulated by the first and second grippers 330 and 350. In such a state, the arm ends of the second and third handling robots 325 and 345 may be separated from the first and second gripper frames 331 and 351, respectively, and the upper portion of the side assembly 3 may be clamped using the third and fourth dampers 333 and 353 of the first and second grippers 330 and 350. The lower portion of the assembly side 3 and the floor assembly 2 may then be key-welded using the first welding robots 410, and the cowl 7, the front roof rail 8a, and the upper portion of the side assembly 3 may be key-welded in the pre-buck section 20.

Accordingly, in the exemplary embodiment of the present disclosure, through the series of processes as described above, the lower portion 4a of the side assembly 3 may be assembled to the opposite sides of the floor assembly 2 through the pre-buck unit 200 in the pre-buck section 20, and the cowl 7 and the front roof rail 8a of the side assembly 3 may be assembled to the upper portion of the side assembly 3. In such a state, the pre-assembled vehicle body may be transported to the main-buck section 50 along the transport path of the vehicle transfer line 1. In particular, in the exemplary embodiment of the present disclosure, the third gripper 530 may be mounted to the arm front end of the fourth handling robot 525. In addition, the fourth gripper 550 may be mounted to the arm front end of the fifth handling robot 545.

Further, the third gripper 530 may clamp the rear roof rail 8b to a predetermined position using the fifth clampers 533, and the fourth gripper 550 may clamp the package tray 9 to a predetermined position using the sixth dampers 553. Next, the fourth coupling pin 535 of the third gripper frame 531 may be coupled to the third docking clamp 520 on a first side of the second post frame 510 by the fourth handling robot 525. In particular, the third docking clamp 520 may couple the fourth coupling pin 535 through the third pin housing 521, and in this state, the third docking clamp 520 may rigidly fix the fourth coupling pin 535 to the third pin housing 521 while coupling balls to the fourth ball coupling groove 537 of the fourth coupling pin 535 by air pressure.

In addition, the fifth coupling pin 555 of the fourth gripper frame 551 may be coupled to the third docking clamp 520 on a second side of the second post frame 510 by the fifth handling robot 545. In particular, the third docking clamp 520 may couple the fifth coupling pin 555 through the third pin housing 521, and in this state, the third docking clamp 520 may rigidly fix the fifth coupling pin 555 to the third pin housing 521 while coupling balls to the fifth ball coupling groove 557 of the fifth coupling pin 557 by air pressure.

Thus, in the exemplary embodiment of the present disclosure, the rear roof rail 8b and the package tray 9 may be accurately matched to predetermined positions on the upper portion of the side assembly 3 while respectively regulating the rear roof rail 8b and the package tray 9 through the third and fourth grippers 530 and 550. In such a state, the arm front ends of the fourth and fifth handling robots 525 and 545 may be separated from the third and fourth gripper frames 531 and 551, and the upper portion of the side assembly 3 may be clamped using the fifth and sixth clampers 533 and 553 of the third and fourth grippers 530 and 550.

Further, the rear roof rail 8b, the package tray 9, and the upper portion of the side assembly 3 may be key-welded through the second welding robots 610 in the main-buck section 50. In other words, in the exemplary embodiment of the present disclosure, the side assembly 2 is not regulated as a separate jig, and the rear roof rail 8b, the package tray 9, and the upper portion of the side assembly 3 may be key-welded while the rear roof rail 8b, the package tray 9, and the upper portion of the side assembly 3 may be regulated through the third and fourth grippers 530 and 550.

In the exemplary embodiment of the present disclosure, the vehicle body of which the rear roof rail 8b and the package tray 9 are assembled to the upper portion of the side assembly 3 in the main-buck section 50 may be transferred to a re-spot process along the vehicle transfer line 1. Then, the lower portion of the side assembly 3 and the floor assembly 2 may be re-spot-welded in the re-spot process, and the cowl 7, the front and rear roof rails 8a and 8b, the package tray 9, and the upper portion of the side assembly 3 may be re-spot-welded to complete the vehicle body assembly of the white body (BIW).

Unlike a conventional art in which a frame of a vehicle body is formed through a single process, the vehicle body assembly system 100 according to the exemplary embodiment of the present disclosure may assembly a vehicle body corresponding to various vehicle models by separating the vehicle body assembly process into two processes, and may be commonly used in multiple vehicles by using robots. Therefore, in the exemplary embodiment of the present disclosure, flexible production of various models of vehicles is possible, equipment preparation time may be reduced, weight reduction and simplification of the entire equipment may be achieved, and investment costs for initial setup and adding of vehicle models may be reduced.

Further, in the exemplary embodiment of the present disclosure, the cowl 7 and the front roof rail 8a may be assembled to the side assembly 3 while being regulated in the pre-buck section 20, and the rear roof rail 8b and the package tray 9 may be assembled to the side assembly 5 while being regulated in the main-buck section 50. Accordingly, in the exemplary embodiment of the present disclosure, a conventional upper CRP vehicle circulator may be removed, thereby reducing investment costs in initial setup and adding of vehicle models.

While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

DESCRIPTION OF SYMBOLS

1: vehicle transfer line
2: floor assembly
3: side assembly
4: reference line
4a: lower portion
4b: upper portion
5a: front pillar
5b: center pillar 5c: rear pillar
5d: rear combination lamp portion
6: reference hole
7: cowl
8a: front roof rail
8b: rear roof rail
9: package tray
20: pre-buck section
21: pre-buck frame
50: main-buck section
51: main-buck frame
100: vehicle body assembly system
110: moving member
111: first driver
113: first servo motor
115: first guide structure
150: rotation index
151: index frame
161: rotor
163: second driver
165: second servo motor
171: hanger coupling portion
173: first docking clamp
175: first pin housing
181: first damper
200: pre-buck unit
210: side hanger
211: hanger frame
231: reference pin
251: second damper
253: third driver
255: third servo motor
257: second guide structure
261: mounting seat
271: first coupling pin
273: first mounting bracket
275: first ball coupling groove
281: first handling robot
310: first post frame
320: second docking clamp
321: second pin housing
325: second handling robot
330: first gripper
331: first gripper frame
333: third damper
335: second coupling pin
336: second mounting bracket
337: second ball coupling groove
345: third handling robot
350: second gripper
351: second gripper frame
353: fourth damper
355: third coupling pin
356: third mounting bracket
357: third ball coupling groove
410: first welding robot
500: main-buck unit
510: second post frame
520: third docking clamp
521: third pin housing
525: fourth handling robot
530: third gripper
531: third gripper frame
533: fifth damper
535: fourth coupling pin
536: fourth mounting bracket
537: fourth ball coupling groove
545: fifth handling robot
550: fourth gripper
551: fourth gripper frame
553: sixth damper
555: fifth coupling pin
556: fifth mounting bracket
557: fifth ball coupling groove
610: second welding robot
810: first storage portion
820: second storage portion

What is claimed is:

1. A vehicle body assembly system in which a pre-buck section and a main-buck section are respectively formed along a transport path of a floor assembly, comprising:
a pre-buck unit disposed in the pre-buck section and configured to regulate a lower portion of a different side assembly for each vehicle model with respect to opposite sides of the floor assembly, regulate a cowl and a front roof rail with respect to an upper portion of the side assembly, and weld the upper portion of the side assembly, the cowl, and the front roof rail;
wherein the pre-buck unit includes:
a first gripper detachably provided in a handling robot, coupled to a first side of a first post frame provided in the transport path of the pre-buck section, and configured to regulate the cowl and the upper portion of the side assembly; and
a second gripper detachably provided in the handling robot, coupled with a second side of the first post frame, and configured to regulate a front roof rail and the upper portion of the side assembly,
wherein the first post frame is coupled to the first and second grippers, the first post frame having first posts provided at opposite sides of the transport path; and
a main-buck unit disposed in the main-buck section, configured to regulate a rear roof rail and a package tray with respect to the upper portion of the side assembly that is pre-assembled in the pre-buck unit, and weld the upper portion of the side assembly, the rear roof rail, and the package tray;
wherein the main-buck unit includes:
a third gripper detachably provided in the handling robot, coupled with a first side of a second post frame provided in the transport path of the main-buck section, and configured to regulate the rear roof rail and the upper portion of the side assembly; and
a fourth gripper detachably provided in the handling robot, coupled to a second side of the second post frame, and configured to regulate the package tray and the upper portion of the side assembly,
wherein the second post frame is coupled to the third and fourth grippers, the second post frame having second posts provided at opposite sides of the transport path.

2. The vehicle body assembly system of claim 1, wherein the pre-buck unit includes:
a rotation index reciprocally movable in a vehicle width direction in pre-buck frames at opposite sides of the transport path, and tiltably rotatable at a predetermined angle; and
a side hanger detachably provided in the handling robot, coupled with the rotation index, and configured to regulate a lower portion of the side assembly.

3. The vehicle body assembly system of claim 1, wherein the first and second grippers are detachably coupled to the first post frame through the handling robot.

4. The vehicle body assembly system of claim 1, wherein the third gripper and the fourth gripper are detachably coupled to the second post frame by the handling robot.

5. A vehicle body assembly system in which a pre-buck section and a main-buck section are respectively formed along a transport path of a floor assembly, comprising:
- a moving member reciprocally movable in a vehicle width direction in pre-buck frames at opposite sides of the transport path in the pre-buck section;
- a rotation index tiltably rotatable at a predetermined angle on the moving member;
- a side hanger that detachably provided in a handling robot, coupled with the rotation index through the handling robot, and configured to regulate a lower portion of a side assembly;
- a first post frame provided in the moving member, the first post frame having first posts provided at opposite sides of the transport path;
- a first gripper detachably provided in the handling robot, coupled to a first side of the first post frame, and configured to regulate a cowl and an upper portion of the side assembly;
- a second gripper detachably provided in the handling robot, coupled to a second side of the first post frame, and configured to regulate a front roof rail and the upper portion of the side assembly;
- a second post frame provided in main-buck frames at opposite sides of the transport path in the main-buck section, the second post frame having second posts provided at opposite sides of the transport path;
- a third gripper detachably provided in the handling robot, coupled to a first side of the second post frame, and configured to regulate a rear roof rail and the upper portion of the side assembly; and
- a fourth gripper detachably provided in the handling robot, coupled to a second side of the second post frame, and configured to regulate a package tray and the upper portion of the side assembly.

6. The vehicle body assembly system of claim 5, wherein the rotation index includes:
- a pair of index frames disposed at a distance from each other on the moving member;
- a rotor that includes four sides where the side hanger that is different for each vehicle model is detachably provided and rotatably provided in the index frame by operation of a driver;
- a hanger coupling portion provided in each side of the rotor and pin-coupled with the side hanger; and
- a plurality of dampers provided in each side of the rotor and fix the side hanger to the rotor.

7. The vehicle body assembly system of claim 6, wherein the hanger coupling portion includes a docking clamp to which a coupling pin provided in the side hanger is coupled while being fitted therein.

8. The vehicle body assembly system of claim 5, wherein the side hanger includes:
- a hanger frame detachably provided at an arm front end of the handling robot;
- at least one reference pin provided in the hanger frame and fitted in a reference aperture of the side assembly;
- a plurality of dampers provided in the hanger frame, clamp a lower portion of the side assembly, and regulate a vehicle body transport direction and a height direction of the side assembly; and
- a coupling pin provided in the hanger frame and coupled with a docking clamp provided in the rotation index.

9. The vehicle body assembly system of claim 8, wherein dampers corresponding to a front pillar, a center pillar, and a rear pillar of the side assembly among the plurality of dampers are reciprocally installed in a vehicle body transport direction.

10. The vehicle body assembly system of claim 8, wherein a plurality of mounting seats are formed to additionally mount the dampers in the hanger frame.

11. The vehicle body assembly system of claim 5, wherein docking clamps where respective coupling pins provided in the first gripper and the second gripper are coupled while being fitted thereto are provided in the first post frame.

12. The vehicle body assembly system of claim 5, wherein docking clamps where respective coupling pins provided in the third gripper and the fourth gripper are coupled while being fitted thereto are provided in the second post frame.

13. The vehicle body assembly system of claim 5, wherein the first gripper includes:
- a first gripper frame detachably provided at an arm front end of the handling robot;
- a plurality of dampers provided in the first gripper frame and clamp an upper portion of the side assembly and a cowl; and
- a coupling pin provided in the first gripper frame and coupled with a docking clamp provided in the first side of the first post frame.

14. The vehicle body assembly system of claim 5, wherein the second gripper includes:
- a second gripper frame detachably provided in an arm front end of the handling robot;
- a plurality of dampers provided in the second gripper frame and clamp an upper portion of the side assembly and a front roof rail; and
- a coupling pin provided in the second gripper frame and coupled with a docking clamp provided in the second side of the first post frame.

15. The vehicle body assembly system of claim 5, wherein the third gripper includes:
- a third gripper frame detachably provided in an arm front end of the handling robot;
- a plurality of dampers provided in the third gripper frame and clamp an upper portion of the side assembly and a rear roof rail; and
- a coupling pin provided in the third gripper frame and coupled with a docking clamp provided in the second side of the second post frame.

16. The vehicle body assembly system of claim 5, wherein the fourth gripper includes:
- a fourth gripper frame detachably provided in an arm front end of the handling robot;
- a plurality of dampers provided in the fourth gripper frame and clamp an upper portion of the side assembly and a package tray; and
- a coupling pin provided in the fourth gripper frame and coupled with a docking clamp provided in the second side of the second post frame.

17. The vehicle body assembly system of claim 5, wherein a first storage portion is disposed in the pre-buck section to store the side hangers that are different for vehicle models, the first grippers, and the second grippers, respectively, and a second storage portion is disposed in the main-buck section to the third grippers and the fourth grippers that are different for vehicle models.

18. The vehicle body assembly system of claim 5, further comprising:
- first welding robots disposed in the pre-buck section, configured to weld the lower portion of the side assembly and the floor assembly, and weld the upper portion of the side assembly, the cowl, and the front roof rail; and second weld robots disposed in the main-buck section, and configured to weld the upper portion of the side assembly, the rear roof rail, and the package tray.

\* \* \* \* \*